United States Patent [19]

Strom

[11] 4,077,828

[45] Mar. 7, 1978

[54] MACHINE FOR MANUFACTURING REINFORCED TUBES

[75] Inventor: Torsten Erik Theodor Ström, Fristad, Sweden

[73] Assignee: AB Gustavsberg, Fristad, Sweden

[21] Appl. No.: 728,280

[22] Filed: Sep. 30, 1976

[51] Int. Cl.² .............................................. B65H 81/00
[52] U.S. Cl. .................................... 156/429; 156/172; 156/175; 156/432; 242/7.22
[58] Field of Search ............... 156/172, 173, 175, 195, 156/429, 431, 432, 446, 457; 242/7.22

[56] References Cited

U.S. PATENT DOCUMENTS

| 2,751,320 | 6/1956 | Jacobs et al. | 156/172 UX |
| 3,032,461 | 5/1962 | Baker et al. | 156/432 |
| 3,677,854 | 7/1972 | Sager | 156/173 |

*Primary Examiner*—William A. Powell
*Attorney, Agent, or Firm*—Finnegan, Henderson, Farabow & Garrett

[57] ABSTRACT

In a machine for manufacturing reinforced tubes there are provided individually rotatable members supplying reinforcement threads around the tube.

4 Claims, 3 Drawing Figures

MACHINE FOR MANUFACTURING REINFORCED TUBES

The invention relates to the manufacture of thread reinforced tubes including rigid tubes as well as flexible tubes such as tubes having such a great flexibility that they may be termed hosings.

The reinforcement of tubes can be of two extreme types: longitudinal reinforcement and circumferential reinforcement. Of these two types the longitudinal reinforcement provides a great tensile strength of the tubes as may be necessary if the tube has to take up great bending stresses when it is laid out over uneven ground for example on a sea bottom or in the earth, while the circumferential reinforcement provides a high burst strength which means that the tube or hose can stand a high internal pressure as may be necessary in case of conduits for fluids of high pressure. The compromise between these two reinforcement types is the so-called cross-wound reinforcement wherein reinforcement threads extend along the tube in two or more helical paths and are wound in such a manner that they cross each other. Then, the adjustment of the desired strength of a tube having a predetermined diameter as to the tensile strength and the burst strength is obtained by an appropriate choice of the cross-winding angle i.e. the angle between the reinforcement threads crossing each other. Thus, it may be necessary to give this angle an individual value from one case to the other in dependence on the diameter of the tube and the material therein as well as in dependence on the demands on the tube as far as the strength characteristics thereof are concerned. Thanks of the possibility to widely adjusting the strength characteristics to the purpose of the tube, the cross-wound reinforcement has become the most common reinforcement in plastic tubes and hoses.

A primary object of the invention is to provide a machine for manufacturing reinforced tubes wherein the desired cross-winding angle is obtained in a simple manner and with high degree of accuracy so that said angle in each individual case can be given exactly the desired value without extensive adjustment operations.

Another object of the invention is to provide a machine of the kind referred to wherein the cross-winding angle can be adjusted during the manufacture of the tube if it should turn out to be necessary, without the machine being shut down.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is provided a machine for manufacturing reinforced tubes comprising a mandrel and means for supplying reinforcement threads, having a number of thread-supply locations distributed around the mandrel, the envelop surface of the mandrel and the thread-supply means being rotatable coaxially and displaceable axially in relation to each other for continuous reinforcement of the tube being manufactured on the mandrel. The thread supply means comprises two members rotatable coaxially in relation to each other, each member having at least one thread supply location, which are operatively interconnected for controlled coaxial relative angular movement of one member in relation to the other, said movement being superposed to the relative rotational movement of the thread-supply means and the envelop surface of the mandrel for cross-wound reinforcement of the tube at a desired cross-winding angle.

The accompanying drawings, which are incorporated in and constitute a part of this specification, illustrate embodiments of the invention and, together with the description, serve to explain the principles of the invention.

Figure 1:
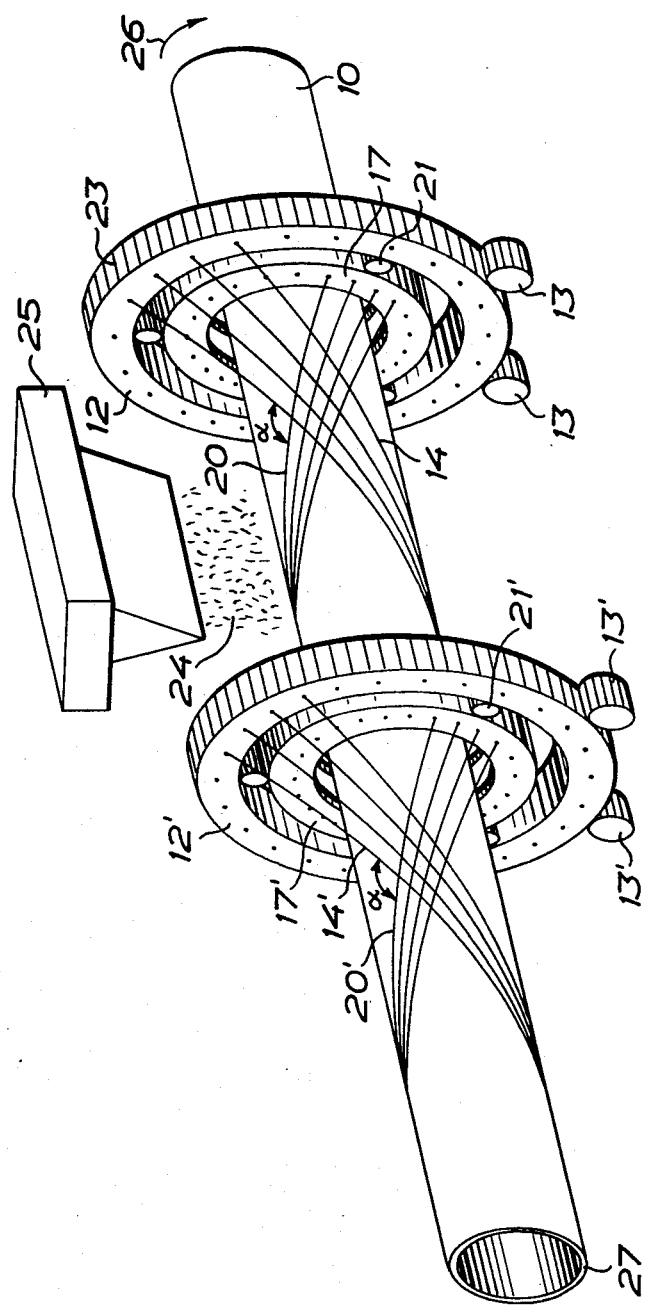
FIG. 1 is a perspective view of a machine according to the teachings of the invention for manufacturing reinforced tubes.

Reference will now be made in detail to the present preferred embodiment of the invention, an example of which is illustrated in the accompanying drawings.

Referring to the drawings, the machine disclosed therein is of the type which comprises an endless steel band 10 forming an axially moving mandrel surface wherein the steel band is guided on a stationary or rotating, but longitudinally stationary, mandrel tube 11 to follow a helical path, the adjacent edges of the band of the helical winding abutting each other so that the steel band forms a continuous cylindrical envelop surface of the mandrel.

Figure 2:
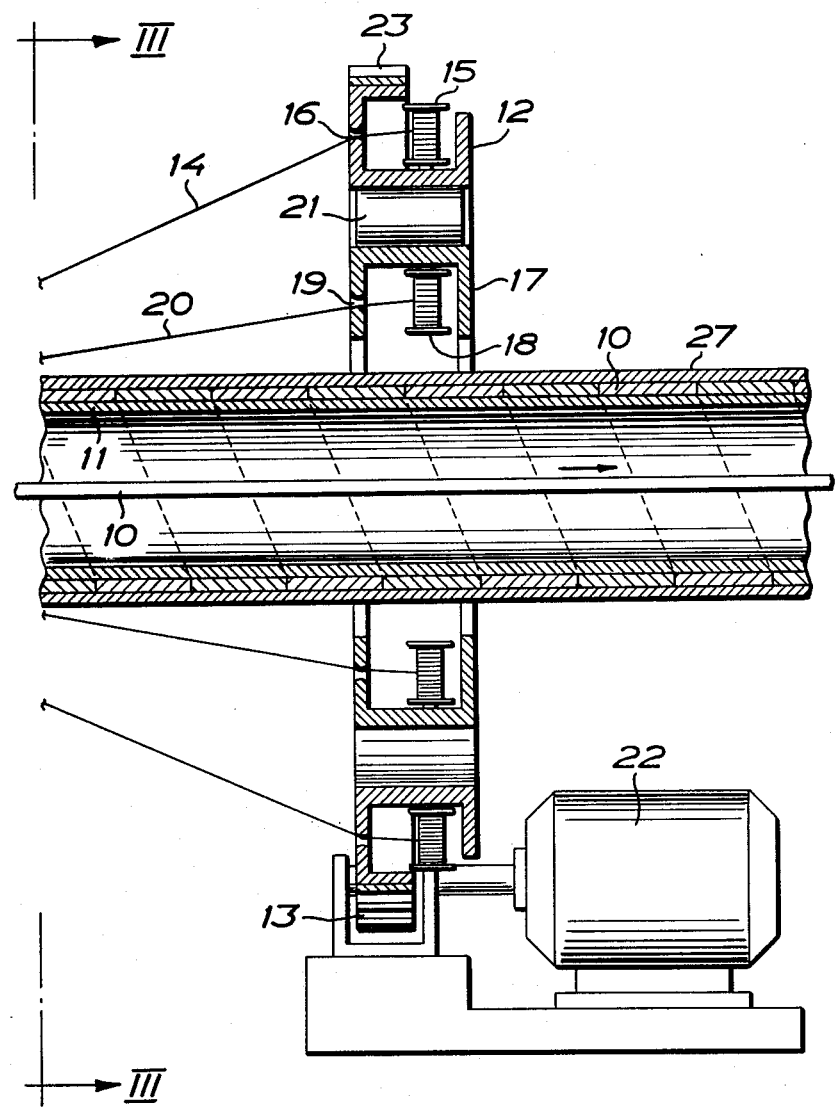
FIG. 2 is an enlarged fragmentary longitudinal sectional view of the machine of FIG. 1 in the area of one pair of rings included in the thread-supply means.

The steel band is fed into the helical path at one end of the mandrel tube, the right-hand end as seen in FIGS. 1 and 2, to move towards the other end, the left-hand end as seen in FIGS. 1 and 2, where the steel band is returned in a suitable manner over guiding and compensating means to the right-hand end in order to continue again in the helical path in a continuous closed cycle. The steel band can be driven by the rotational movement of the mandrel tube or by means of separate drive means if the mandrel tube is non-rotatable. In said latter case the mandrel tube is provided with antifriction members supporting the steel band on the mandrel tube. In dependence on the pitch of the helical steel band and the feed rate thereof in the helical path there are obtained different rotational rates of the mandrel surface as well as an axial speed from the right to the left as seen in FIGS. 1 and 2. On this rotating and axially moving mandrel surface the reinforced tube is produced progressively from the right to the left the tube being given the desired wall thickness and the desired reinforcement so that the tube when finished can leave the mandrel at the left end thereof, the tube being pushed off the mandrel freely projecting from the end thereof. This type of machine and the mandrel structure thereof is well-known in the art and is termed the Drostholm system. One embodiment thereof is disclosed in the Swedish laid-open specification 7110603-3.

Figure 3:
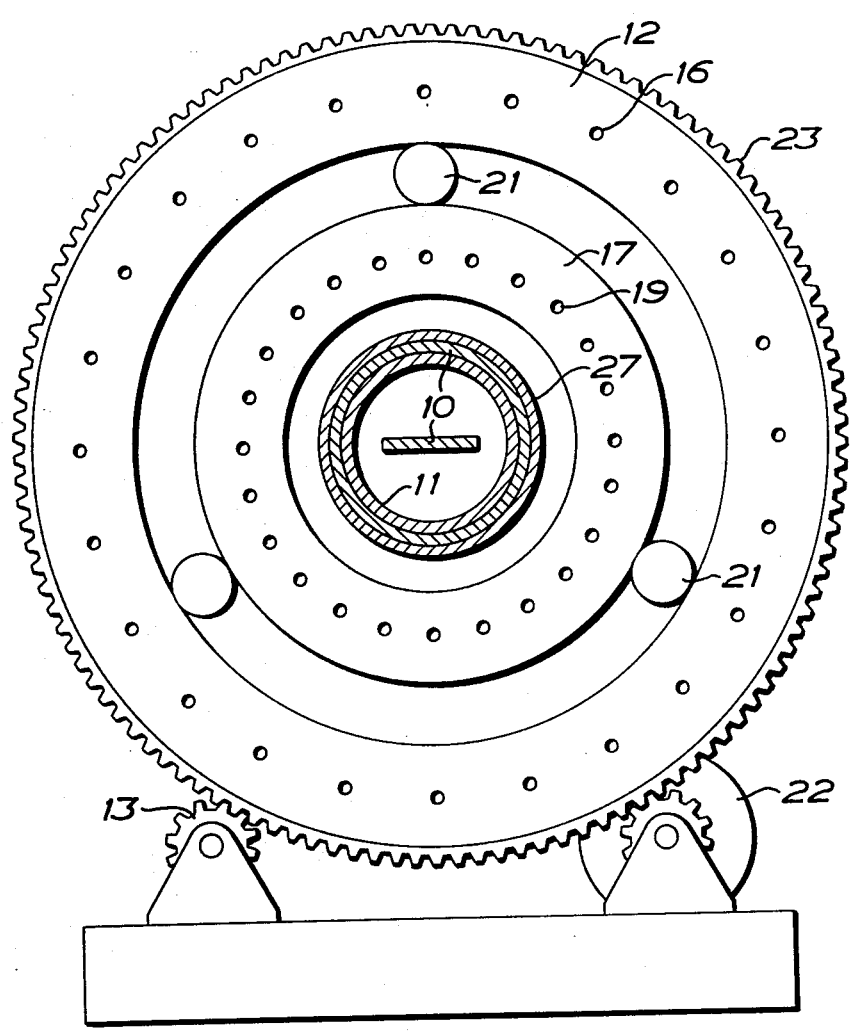
FIG. 3 is a cross sectional view taken along line III—III in FIG. 2.

Around mandrel 10 there is provided a circular ring 12 which is supported by suitable outside bearings or rollers 13 which allow the ring to be rotated about the axis of the mandrel. As shown there extend from this ring a number of reinforcement threads 14 which are distributed over the total circumference of the ring as seen in FIG. 3 although they are shown only over a fraction of the circumference in FIG. 1. These threads are supplied from thread coils 15 provided on ring 12 or supported by suitable members thereon and pass from coils 15 through thread guides or openings 16 which are regularly distributed over the circumference of the ring. In this connection it is essential that the reinforcement threads 14 emanate from a number of thread supply locations regularly distributed circumferentially of ring 12.

A smaller ring 17 is arranged concentrically with ring 12 inside said latter ring and is provided in the manner described with thread coils 18 and thread guides or openings 19 for supplying a number of reinforcement threads 20 from a corresponding number of thread supply locations which are distributed regularly over the circumference of ring 17. Between the two rings there are provided bearing members or spacers 21 supporting the inner ring 17 for rotation in relation to mandrel 10, 11 as well as the outer ring 12, for example, planetary gearings or other transmission members. When the outer ring 12 is being rotated by drive means comprising an electric drive motor 22 which is connected to one of the supporting rollers 13 formed as a gear engaging a gear rim 23 on ring 12, such members transmitting the drive movement to the inner ring 17 at a predetermined and preferably easily adjustable gear ratio. The purpose thereof will be explained in more detail below.

Threads 14 and 20 can be of glass, polyester, metal or textile material and they are deposited in a suitable binder on the mandrel surface 10, e.g. in a thermosetting resin such as polyester. There can also be supplied a filler such as glass fibres or sand as indicated at 24 said filler falling down into the binder from a hopper 25. Any known binder, reinforcement material or filler can be used; the type of such material is of no importance in connection with the present invention.

After hopper 25 as seen in the direction of longitudinal movement of the mandrel surface there is provided a second pair of concentric rings 12' and 17' for threads 14' and 20', respectively, spaced axially from rings 12 and 17, or there may be provided any number of such thread reinforcement means of similar construction as rings 12 and 17 and their respective threads. Rings 12' and 17' are spaced by transmissions 21' and for the rings there is provided drive means 22', 13', 23'.

Let it be assumed that the mandrel surface 10 rotates in the direction indicated by arrow 26 at an angular rate A and that rings 12 and 17 are rotated in the same direction at angular rates B and C, respectively. Now, different relationships between rates A, B and C may be considered, and in dependence on these relationships the reinforcement will vary from the extreme case of a straight longitudinal reinforcement to the other extreme case of a circumferential reinforcement.

If it is assumed initially that B = C = A, a point of ring 12 will maintain the angular position thereof in relation to a point on ring 17 and mandrel surface 10. The mandrel surface and the rings thus will rotate together without any change of their relative angular positions i.e. they will rotate in position and rate syncronism. As will be realized this means that threads 14 and 20 will be deposited longitudinally in straight paths along the mandrel, and in this manner there will be produced a longitudinally reinforced tube 27 having a great tensile strength, the burst strength however being relatively low.

In the other extreme case B = C = O which means that the two rings 12 and 17 are stationary in predetermined angular position while the mandrel surface 10 rotates and simultaneously moves longitudinally. Threads 14 and 20 in this case will be deposited in helically paths around the mandrel at a very small pitch, and thus the tube will be provided with a circumferential or annular reinforcement (resembling a girdle reinforcement) which provides a high burst strength while the tensile strength of the tube is not particularly high.

The most interesting reinforcement case is that wherein B<A<C. Then, ring 12 will rotate at a lower speed than mandrel surface 10 and thus will move relative to the mandrel surface lagging in relation to said surface while ring 17 will rotate at a higher speed than mandrel surface 10 as well as ring 12 and thus will move relative to the mandrel surface leading in relation to said surface. The speed difference of B and C in relation to A provides a cross winding angle designated $\alpha$ in the drawings. By varying speeds B and C in relation to each other and in relation to A there is thus the possibility to vary the value of the cross-winding angle and to provide a cross-wound reinforcement of the type which is most favourable in a tube for a predetermined purpose.

As an example it may be assumed that the diameter of mandrel 10, 11 is 500 millimeters and that the width of steel band 10 forming part of the mandrel is 40 millimeters. This means that the mandrel surface and the longitudinal movement of the material deposited thereon will be 40 millimeters for each revolution of the mandrel surface. If in this case speeds A, B and C have a ratio of for example 1.0:0.9:1.1 the cross winding angle $\alpha$ will be about 30°.

In the example discussed above the tube will be provided with two cross-wound reinforcements, filler being provided therebetween. It is not necessary of course that these cross-wound reinforcements have the same cross-winding angle $\alpha$ nor is it necessary that they are made of the same thread material. The finished thread-reinforced plastic tube 26 is pushed progressively off the mandrel at the left end thereof as a continuous length in a manner which is well-known in the art.

The constructive embodiment of a machine according to the teachings of the invention could be modified without departing from the invention as defined in the appended claims. The arrangement including concentric rings 12 and 17 and transmissions 21 therebetween can easily be realized but it is also of course possible to provide coaxial individually driven tubular members or spiders on which the two series of thread supply locations distributed circumferentially are provided. In some cases it would be conceivable to have more than two coaxial or concentric series of thread supply locations and it is also conceivable to have a plurality of series of thread-supply locations distributed circumferentially which are spaced axially in the longitudinal direction of the mandrel.

It will be apparent to those skilled in the art that various other modifications and variations in addition to those mentioned above could be made in the machine of the invention without departing from the scope and spirit of the invention.

What is claimed is:

1. In a machine for manufacturing reinforced tubes comprising a mandrel and means for supplying reinforcement threads having a number of thread-supply locations distributed around the mandrel, the envelop surface of the mandrel and the thread-supply means being rotatable coaxially and displaceable axially in relation to each other for continuous reinforcement of the tube being manufactured on the mandrel, the improvement wherein said thread-supply means comprises two concentric rings rotatable coaxially in relation to each other, each ring having at least one thread-supply location, and spacers operatively interconnecting said rings for controlled coaxial relative rotation of one ring in relation to the other, said rotation being superposed to the relative rotational movement of the thread-supply means and the envelop surface of the mandrel for cross-wound reinforcement of the tube at a desired cross-winding angle.

2. The improvement as claimed in claim 1 wherein the spacers comprise gearing means for rotating one ring by means of the other.

3. The improvement as claimed in claim 2 wherein the gearing rate of said gearing means is variable.

4. The improvement as claimed in claim 1 wherein said thread-supply means also includes thread coils rotatably mounted within said rings.

* * * * *